US008724596B2

(12) United States Patent
Iwamura et al.

(10) Patent No.: US 8,724,596 B2
(45) Date of Patent: May 13, 2014

(54) MOBILE COMMUNICATION METHOD, RADIO BASE STATION, AND MOBILE STATION

(75) Inventors: Mikio Iwamura, Tokyo (JP); Anil Umesh, Tokyo (JP)

(73) Assignee: NTT DoCoMo, Inc., Tokyo (JP)

( * ) Notice: Subject to any disclaimer, the term of this patent is extended or adjusted under 35 U.S.C. 154(b) by 0 days.

(21) Appl. No.: 13/643,559

(22) PCT Filed: Apr. 27, 2011

(86) PCT No.: PCT/JP2011/060301
§ 371 (c)(1),
(2), (4) Date: Jan. 3, 2013

(87) PCT Pub. No.: WO2011/136290
PCT Pub. Date: Nov. 3, 2011

(65) Prior Publication Data
US 2013/0100838 A1    Apr. 25, 2013

(30) Foreign Application Priority Data
Apr. 28, 2010    (JP) .................................. 2010-104281

(51) Int. Cl.
*H04W 4/00* (2009.01)
*H04W 36/00* (2009.01)

(52) U.S. Cl.
USPC ........ 370/332; 370/310.2; 455/437; 455/438; 455/439; 455/442; 455/443; 455/444

(58) Field of Classification Search
USPC ...................... 370/310.2, 328, 331, 332, 334; 455/436–439, 442–444, 115.1–115.4
See application file for complete search history.

(56) References Cited

U.S. PATENT DOCUMENTS

| 2009/0239537 | A1* | 9/2009 | Iwamura et al. | 455/436 |
| 2009/0262654 | A1* | 10/2009 | Iwamura et al. | 370/252 |
| 2010/0105377 | A1* | 4/2010 | Iwamura et al. | 455/424 |
| 2010/0303039 | A1* | 12/2010 | Zhang et al. | 370/331 |
| 2011/0170418 | A1* | 7/2011 | Sagfors et al. | 370/241 |
| 2011/0310753 | A1* | 12/2011 | Chou et al. | 370/252 |
| 2012/0003943 | A1* | 1/2012 | Marinier et al. | 455/73 |

FOREIGN PATENT DOCUMENTS

CN    101605352 A    12/2009

OTHER PUBLICATIONS

R2-102216 "Measurement Events for Component Carrier Management", MediaTek; 3GPP TSG-RAN WG2 #69, Beijing, China, available Apr. 12-16, 2010.*
R2-102098 "Measurement Events in Carrier Aggregation", Nokia; 3GPP TSG-RAN WG2 #69, Beijing, China, available Apr. 12-16, 2010.*

(Continued)

*Primary Examiner* — Benjamin H Elliott, IV
(74) *Attorney, Agent, or Firm* — Osha Liang LLP

(57) ABSTRACT

A mobile communication method according to the present invention includes a step of notifying, by a radio base station eNB, a mobile station UE of: a condition under which a measurement report is triggered; a measurement-report target CC having a measurement result that should be reported at the same time when the measurement report is performed; and the maximum number of cells, on the measurement-report target CC, having a measurement result that should be reported, and a step of transmitting, by the mobile station UE, a measurement result of a cell of which the number is equal to or less than the notified maximum number, for each notified measurement-report target CC.

2 Claims, 6 Drawing Sheets

(56) References Cited

OTHER PUBLICATIONS

R2-102038 "Summary of Email Discussion", Ericsson; 3GPP TSG-RAN WG2 #69, Beijing, China, available Apr. 12-16, 2010.*

R2-102176 "Measurements Events and Related Use Cases", ZTE; 3GPP TSG-RAN WG2 #69, Beijing, China, available Apr. 12-16, 2010.*

R2-102498 "CC Management and Measurements in CA", NTT DoCoMo; 3GPP TSG-RAN WG2 #69, Beijing, China, available Apr. 12-16, 2010.*

R2-102250 "Measurement Evaluation in CA", LG; 3GPP TSG-RAN WG2 #69, Beijing, China, available Apr. 12-16, 2010.*

R2-102448 "Inter-RAT Measurement for Coverage Optimisation Use Case", NTT DoCoMo; 3GPP TSG-RAN WG2 #69, Beijing, China, available Apr. 12-16, 2010.*

International Search Report issued in PCT/JP2011/060301 mailed Jul. 26, 2011 (4 pages).

Samsung; "Handover—stage 2 level issues"; 3GPP TSG-RAN2#69 bis meeting, R2-102359; Beijing, China; Apr. 12-16, 2010 (6 pages).

NTT Docomo, Inc.; "CC management and measurements in CA"; 3GPP TSG-RAN WG2 #69bis, R2-102498; Beijing, China; Apr. 12-16, 2010 (3 pages).

NTT Docomo, Inc.; "Measurement enhancements to support CA operation"; 3GPP TSG-RAN WG2 #70bis, R2-104044; Stockholm, Sweden; Jun. 28-Jul. 2, 2010 (4 pages).

NTT Docomo, Inc.; "Enhancements related to inter-eNB handover during CA"; 3GPP TSG-RAN WG2 #70, R2-103061; Montreal, Canada; May 10-14, 2010 (3 pages).

Ericcson et al.; "Stage-3 details of Additional Reporting for CA"; 3GPP TSG-RAN WG2 #71bis, R2-105532; Xi'an, China; Oct. 11-15, 2010 (11 pages).

Office Action for Chinese Application No. 201180021532.8 dated May 3, 2013, with English translation thereof (13 pages).

Espacenet, Patent Abstract for Chinese Publication No. CN101605352 published Dec. 16, 2009 (1 page).

Chinese Office Action issued in Chinese Patent Application No. 201180021532.8, mailing date Nov. 28, 2013, with English translation thereof (14 pages).

* cited by examiner

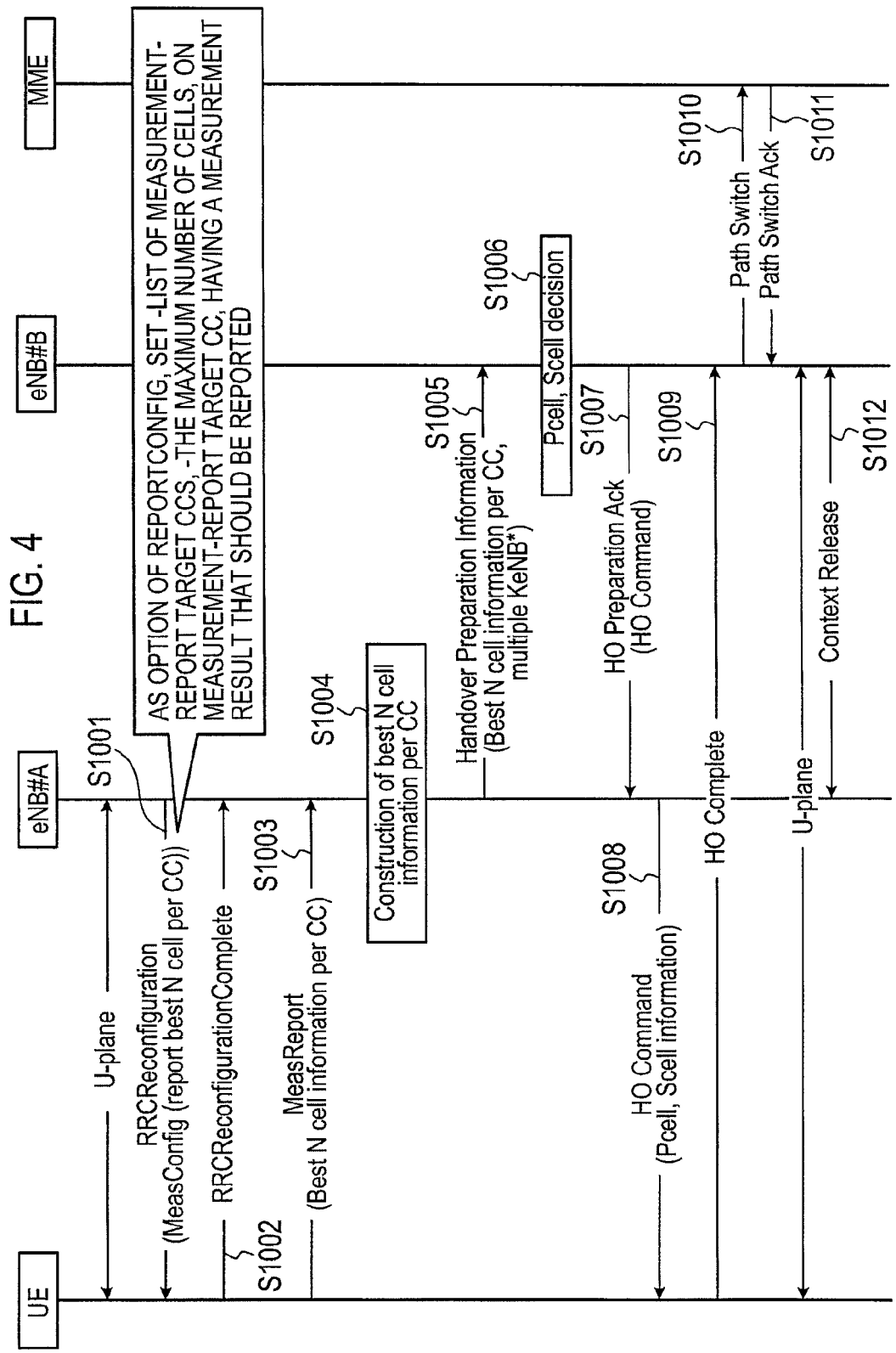

FIG. 5

*ReportConfigEUTRA*

```
-- ASN1START

ReportConfigEUTRA ::=          SEQUENCE {
    triggerType                    CHOICE {
        event                          SEQUENCE {
            eventId                        CHOICE {
                eventA1                        SEQUENCE {
                    a1-Threshold                   ThresholdEUTRA
                },
                eventA2                        SEQUENCE {
                    a2-Threshold                   ThresholdEUTRA
                },
                eventA3                        SEQUENCE {
                    a3-Offset                      INTEGER (-30..30),
                    reportOnLeave                  BOOLEAN
                },
                eventA4                        SEQUENCE {
                    a4-Threshold                   ThresholdEUTRA
                },
                eventA5                        SEQUENCE {
                    a5-Threshold1                  ThresholdEUTRA,
                    a5-Threshold2                  ThresholdEUTRA
                },
                ...
            },
            hysteresis                     Hysteresis,
            timeToTrigger                  TimeToTrigger
        },
        periodical                     SEQUENCE {
            purpose                        ENUMERATED {
                                               reportStrongestCells, reportCGI}
        }
    },
    triggerQuantity                ENUMERATED {rsrp, rsrq},
    reportQuantity                 ENUMERATED {sameAsTriggerQuantity, both},
    maxReportCells                 INTEGER (1..maxCellReport),
    reportInterval                 ReportInterval,
    reportAmount                   ENUMERATED {r1, r2, r4, r8, r16, r32, r64, infinity},
    ...,
    [[ si-RequestForHO-r9          ENUMERATED {setup}    OPTIONAL,   -- Cond reportCGI
       ue-RxTxTimeDiffPeriodical-r9 ENUMERATED {setup}   OPTIONAL    -- Need OR
    ]]
    reportOnOtherCC-r10            CHOICE {
        release                        NULL,
        setup                          SEQUENCE {
            measObjectIdList-r10           MeasObjectIdList-r10,
            maxReportCellsPerCC-r10        INTEGER (1..maxCellReport)
        }
    }                                                     OPTIONAL    -- Need ON
}

MeasObjectIdList ::=           SEQUENCE OF (SIZE (1..maxCC-Report)) MeasObjectId ThresholdEUTRA ::=             CHOICE{
    threshold-RSRP                 RSRP-Range,
    threshold-RSRQ                 RSRQ-Range
}

-- ASN1STOP
```

FIG. 6

```
                                              MeasResults
-- ASN1START
MeasResults ::=                     SEQUENCE {
    measId                              MeasId,
    measResultServCell                  SEQUENCE {
        rsrpResult                          RSRP-Range,
        rsrqResult                          RSRQ-Range
    },
    measResultNeighCells                CHOICE {
        measResultListEUTRA                 MeasResultListEUTRA,
        measResultListUTRA                  MeasResultListUTRA,
        measResultListGERAN                 MeasResultListGERAN,
        measResultsCDMA2000                 MeasResultsCDMA2000,
        ...
    }                                                                       OPTIONAL,
    ...,
    [[ measResultForECID-r9              MeasResultForECID-r9                OPTIONAL
    ]],
    measResultListOnOtherCC-r10         MeasResultListOnOtherCC-r10          OPTIONAL
}

MeasResultListOnOtherCC-r10 ::=     SEQUENCE (SIZE (1..maxCC-Report)) OF MeasResultOnOtherCC-r10

MeasResultOnOtherCC-r10 ::=         SEQUENCE (SIZE (1..maxCellReport)) OF MeasResultEUTRA2

MeasResultEUTRA2 ::=                SEQUENCE {
    physCellId                          PhysCellId,
    rsrpResult                          RSRP-Range,
    rsrqResult                          RSRQ-Range
}

MeasResultListEUTRA ::=             SEQUENCE (SIZE (1..maxCellReport)) OF MeasResultEUTRA MeasResultEUTRA ::= SEQUENCE {
    physCellId                          PhysCellId,
    cgi-Info                            SEQUENCE {
        cellGlobalId                        CellGlobalIdEUTRA,
        trackingAreaCode                    TrackingAreaCode,
        plmn-IdentityList                   PLMN-IdentityList2              OPTIONAL
    }                                                                       OPTIONAL,
    measResult                          SEQUENCE {
        rsrpResult                          RSRP-Range                      OPTIONAL,
        rsrqResult                          RSRQ-Range                      OPTIONAL,
        ...,
        [[ additionalSI-Info-r9             AdditionalSI-Info-r9            OPTIONAL
        ]]
    }
}

MeasResultListUTRA ::=              SEQUENCE (SIZE (1..maxCellReport)) OF MeasResultUTRA MeasResultUTRA ::= SEQUENCE {
    physCellId                          CHOICE {
        fdd                                 PhysCellIdUTRA-FDD,
        tdd                                 PhysCellIdUTRA-TDD
    },
    cgi-Info                            SEQUENCE {
        cellGlobalId                        CellGlobalIdUTRA,
        locationAreaCode                    BIT STRING (SIZE (16))          OPTIONAL,
        routingAreaCode                     BIT STRING (SIZE (8))           OPTIONAL,
        plmn-IdentityList                   PLMN-IdentityList2              OPTIONAL
    }                                                                       OPTIONAL,
    measResult                          SEQUENCE {
        utra-RSCP                           INTEGER (-5..91)                OPTIONAL,
        utra-EcN0                           INTEGER (0..49)                 OPTIONAL,
        ...,
        [[ additionalSI-Info-r9             AdditionalSI-Info-r9            OPTIONAL
        ]]
    }
}

MeasResultListGERAN ::=             SEQUENCE (SIZE (1..maxCellReport)) OF MeasResultGERAN MeasResultGERAN ::= SEQUENCE {
    carrierFreq                         CarrierFreqGERAN,
    physCellId                          PhysCellIdGERAN,
    cgi-Info                            SEQUENCE {
        cellGlobalId                        CellGlobalIdGERAN,
        routingAreaCode                     BIT STRING (SIZE (8))           OPTIONAL
    }                                                                       OPTIONAL,
    measResult                          SEQUENCE {
        rssi                                INTEGER (0..63),
        ...
    }
}

MeasResultsCDMA2000 ::=             SEQUENCE {
    preRegistrationStatusHRPD           BOOLEAN,
    measResultListCDMA2000              MeasResultListCDMA2000
}

MeasResultListCDMA2000 ::=          SEQUENCE (SIZE (1..maxCellReport)) OF MeasResultCDMA2000

MeasResultCDMA2000 ::= SEQUENCE {
    physCellId                          PhysCellIdCDMA2000,
    cgi-Info                            CellGlobalIdCDMA2000                OPTIONAL,
    measResult                          SEQUENCE {
        pilotPnPhase                        INTEGER (0..32767)              OPTIONAL,
        pilotStrength                       INTEGER (0..63),
        ...
    }
}

MeasResultForECID-r9 ::=            SEQUENCE {
    ue-RxTxTimeDiffResult-r9            INTEGER (0..4095),
    currentSFN-r9                       BIT STRING (SIZE (10))
}

PLMN-IdentityList2 ::=              SEQUENCE (SIZE (1..5)) OF PLMN-Identity

AdditionalSI-Info-r9 ::=            SEQUENCE {
    csg-MemberStatus-r9                 ENUMERATED {member}                 OPTIONAL,
    csg-Identity-r9                     CSG-Identity                        OPTIONAL
}

-- ASN1STOP
```

FIG. 7

*HandoverPreparationInformation*

```
-- ASN1START

HandoverPreparationInformation ::=   SEQUENCE {
    criticalExtensions            CHOICE {
        c1                            CHOICE{
            handoverPreparationInformation-r8   HandoverPreparationInformation-r8-IEs,
            spare7 NULL,
            spare6 NULL, spare5 NULL, spare4 NULL,
            spare3 NULL, spare2 NULL, spare1 NULL
        },
        criticalExtensionsFuture      SEQUENCE {}
    }
}

HandoverPreparationInformation-r8-IEs ::= SEQUENCE {
    ue-RadioAccessCapabilityInfo   UE-CapabilityRAT-ContainerList,
    as-Config                      AS-Config                              OPTIONAL,    -- Cond HO
    rrm-Config                     RRM-Config                             OPTIONAL,
    as-Context                     AS-Context                             OPTIONAL,    -- Cond HO
    nonCriticalExtension           HandoverPreparationInformation-v920-IEs   OPTIONAL
}

HandoverPreparationInformation-v920-IEs ::= SEQUENCE {
    ue-ConfigRelease-r9            ENUMERATED {
        rel9, spare7, spare6, spare5, spare4, spare3,
        spare2, spare1, ...}                                              OPTIONAL,    -- Cond HO2
    nonCriticalExtension           HandoverPreparationInformation-v10x0-IEs  OPTIONAL
}

HandoverPreparationInformation-v10x0-IEs ::= SEQUENCE {
    meas-Context-r10               Meas-Context-r10                       OPTIONAL,    -- Cond HO
    nonCriticalExtension           SEQUENCE {}                            OPTIONAL
}

-- ASN1STOP
```

*Meas-Context*

```
-- ASN1START

Meas-Context-r10 ::=              SEQUENCE {
    measResultListOnOtherCC-r10       MeasResultListOnOtherCC-r10,
    ...
}

-- ASN1STOP
```

MOBILE COMMUNICATION METHOD, RADIO BASE STATION, AND MOBILE STATION

TECHNICAL FIELD

The present invention relates to a mobile communication method, a radio base station, and a mobile station.

BACKGROUND ART

In an LTE (Long Term Evolution) mobile communication system in 3GPP, a mobile station UE receives, as a setting related to a measurement, "MeasConfig" from a radio base station eNB. The "MeasConfig" may include one or a plurality of "ReportConfig", "MeasObject", or "MeasId".

The "ReportConfig" is used to set a condition under which a measurement report "MeasReport" from the mobile station UE to the radio base station eNB is triggered.

For example, in a condition defined in "Event A3", when a measurement result of a neighboring cell is higher than an offset than a measurement result of a current serving cell, the "MeasReport" is triggered.

Furthermore, in a condition defined in "Event A4", when a measurement result of a neighboring cell is higher than a predetermined threshold value, the "MeasReport" is triggered.

The offset, the threshold value, the type of a condition, etc., are set in the "ReportConfig".

Furthermore, the "MeasObject" is used to set RAT or a frequency that the mobile station UE should measure. The "MeasObject" includes an offset value that should be applied to a measurement result for each cell, a list of cells that should be excluded from a cell to be measured, and the like.

The "MeasId" is used to link a single "ReportConfig" to a single "MeasObject", and the mobile station UE measures only "MeasObject" in which the "MeasId" has been set, and transmits the measurement report "MeasReport" to the radio base station eNB only when satisfying a condition of the "ReportConfig" linked to the "MeasObject" by the "MeasId".

The mobile station UE is to report the measurement results of a cell on the "MeasObject", in which the condition is satisfied, and a current serving cell, through the "MeasReport".

In the 3GPP, in an LTE-Advanced mobile communication system, when a mobile station UE performs a handover during a CA (Carrier Aggregation) communication, it is not determined which one of: a radio base station S-eNB managing a handover source cell; and a radio base station T-eNB managing a handover destination cell, selects PCC (Primary Component Carrier) of the mobile station UE in the handover destination cell.

On this point, the following two points have been proposed in Non Patent Literature 1.

(1) A radio base station eNB#A managing the handover source cell selects the PCC of the mobile station UE in the handover destination cell.

(2) In order for a radio base station eNB#B managing the handover destination cell to select SCC (Secondary Component Carrier) of the mobile station UE in the handover destination cell, the radio base station eNB#A managing the handover source cell transfers a measurement result of the handover destination cell on each CC (Component Carrier) to the radio base station eNB#B managing the handover destination cell.

For example, according to Non Patent Literature 1, in an example of FIG. 9, when a mobile station UE covering "Pcell=A11" and "Scell=A21" is handed over to a cell subordinate to the radio base station eNB#B, the radio base station eNB#A is configured to transfer measurement results of a cell B13 and a cell B23 to the radio base station eNB#B.

Furthermore, in the example of FIG. 9, it is assumed that cells A11, A12, A13, B11, B12, B13, C11, C12, and C13 are cells on CC#1, and cells A21, A22, A23, B21, B22, B23, C21, C22, and C23 are cells on CC#2 having a carrier frequency different from that of the CC#1.

CITATION LIST

Non Patent Literature

[NPL 1] 3GPP contribution R2-102359

SUMMARY OF INVENTION

Technical Problem

However, the mobile communication system has a problem that when there is no information other than that of the cell B13 and the cell B23, it is not possible for the radio base station eNB#B to appropriately select Scell of the mobile station UE.

That is, in the example of FIG. 9, on the CC#2, when a radio quality of the cell C22 is superior to a radio quality of the cell B23, if the cell B23 is set as the Scell, the radio base station eNB#B selects a cell in which a radio quality on SCC is not optimal, so that interference is increased, thereby causing a problem that the efficiency of an entire system is likely to be reduced.

Therefore, the present invention has been achieved in view of the above-described problems, and an object thereof is to provide a mobile communication method, a radio base station, and a mobile station, by which it is possible to select Scell of a mobile station UE without an increase in interference in a handover of the mobile station during a CA communication.

Solution to Problem

A first characteristic of the present embodiment is summarized in that a mobile communication method, in which a mobile station communicates with a radio base station by using a plurality of carriers having different carrier frequencies, includes: a step of notifying, by the radio base station, the mobile station of: a condition under which a measurement report is triggered; a measurement-report target carrier having a measurement result that should be reported at the same time when the measurement report is performed; and the maximum number of cells, on the measurement-report target carrier, having a measurement result that should be reported; and a step of transmitting, by the mobile station, a measurement result in a cell of which the number is equal to or less than the notified maximum number, for each notified measurement-report target carrier.

A second characteristic of the present embodiment is summarized in that a radio base station, which is used in a mobile communication system in which a mobile station is configured to be capable of communicating with the radio base station by using a plurality of carriers having different carrier frequencies, includes: a notification unit configured to notify the mobile station of: a condition under which a measurement report is triggered; a measurement-report target carrier having a measurement result that should be reported at the same time when the measurement report is performed; and the maximum number of cells, on the measurement-report target carrier, having a measurement result that should be reported.

A third characteristic of the present embodiment is summarized in that a mobile station, which is configured to be capable of communicating with a radio base station by using a plurality of carriers having different carrier frequencies, includes: a reception unit configured to receive, from the radio base station, a control signal including: a condition under which a measurement report is triggered; a measurement-report target carrier having a measurement result that should be reported at the same time when the measurement report is performed; and the maximum number of cells, on the measurement-report target carrier, having a measurement result that should be reported; and a transmission unit configured to transmit a measurement result in a cell of which the number is equal to or less than the notified maximum number included in the control signal, for each measurement-report target carrier included in the received control signal.

Advantageous Effects of Invention

As described above, according to the present invention, it is possible to provide a mobile communication method, a radio base station, and a mobile station, with which it is possible to select Scell of a mobile station UE without an increase in interference in a handover of the mobile station during a CA communication.

BRIEF DESCRIPTION OF DRAWINGS

FIG. 4 is a sequence diagram for explaining an operation of the mobile communication system according to the first embodiment of the present invention.

FIG. 5 is a diagram showing an example of a format of a "ReportConfigEUTRA" message used in the mobile communication system according to the first embodiment of the present invention.

FIG. 6 is a diagram showing an example of a format of a "MeasResults" message used in the mobile communication system according to the first embodiment of the present invention.

FIG. 7 is a diagram showing an example of a format of a "HandoverPreparationInformation" message used in the mobile communication system according to the first embodiment of the present invention.

DESCRIPTION OF EMBODIMENTS

Mobile Communication System According to First Embodiment of the Present Invention With reference to FIG. 1 through FIG. 8, the configuration of a mobile communication system according to a first embodiment of the present invention will be described. The mobile communication system according to the present embodiment is an LTE-Advanced (LTE Release-10) mobile communication system.

In the mobile communication system according to the present embodiment, a mobile station UE is configured to be capable of performing a CA communication by using a plurality of CCs, specifically, PCC and one or a plurality of SCCs having a carrier frequency (EARFCN) different from that of the PCC.

Figure 1:
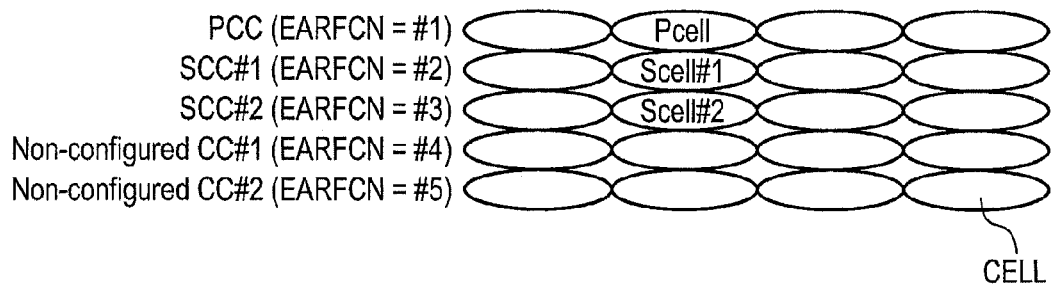
FIG. 1 is a diagram showing the entire configuration of a mobile communication system according to a first embodiment of the present invention.

As shown in FIG. 1, the mobile communication system according to the present embodiment is configured to be capable of using CCs of EARFCN #1 through EARFCN #5 during the CA communication.

In the mobile communication system according to the present embodiment, as shown in FIG. 1, the mobile station UE performs a CA communication by setting the CC of EARFCN #1 as "PCC", the CC of EARFCN #2 as "SCC #1", and the CC of EARFCN #3 as "SCC #2".

Furthermore, the serving cell on the PCC of the mobile station UE is "Pcell", the serving cell on the SCC #1 of the mobile station UE is "Scell #1", and the serving cell on the SCC #2 of the mobile station UE is "Scell #2".

Figure 2:
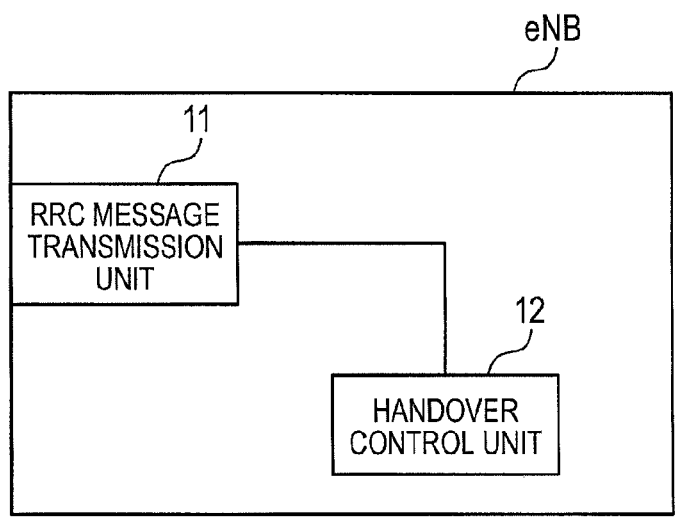
FIG. 2 is a functional block diagram of a radio base station according to the first embodiment of the present invention.

As shown in FIG. 2, a radio base station eNB includes an RRC (Radio Resource Control) message transmission unit 11 and a handover control unit 12.

The RRC message transmission unit 11 is configured to transmit an RRC message such as an "RRCReconfiguration" message to the mobile station UE in an RRC_Connected state.

Furthermore, the RRC message transmission unit 11 may be configured to notify the mobile station UE of "MeasConfig" by the "RRCReconfiguration" message.

Furthermore, the RRC message transmission unit 11 may be configured to notify CC (measurement-report target CC) having a measurement result that should be reported at the same time when "MeasReport" is transmitted, and the maximum number of cells, on the measurement-report target CC, having a measurement result that should be reported.

The handover control unit 12 is configured to perform control related to a handover process of the mobile station UE.

For example, in a handover process of the mobile station UE from a cell subordinate to a radio base station eNB (S-eNB) to a cell subordinate to another radio base station T-eNB, the handover control unit 12 is configured to transmit a measurement result of a predetermined number of cells in each CC to another radio base station T-eNB.

Figure 3:
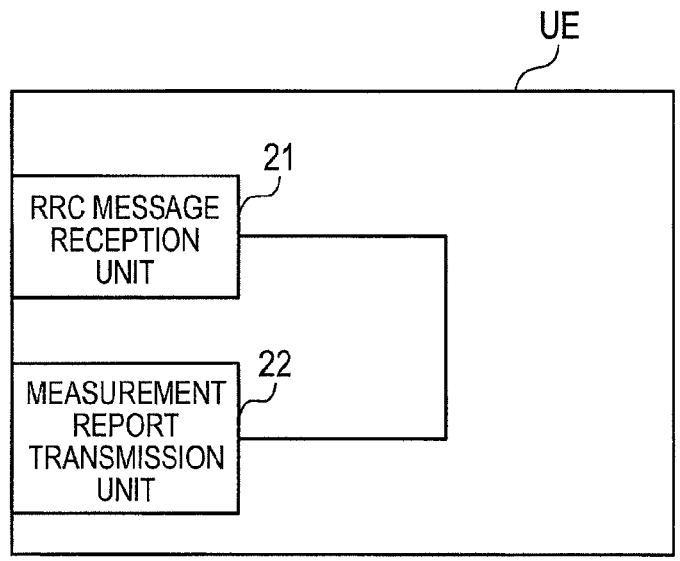
FIG. 3 is a functional block diagram of a mobile station according to the first embodiment of the present invention.

As shown in FIG. 3, the mobile station UE includes an RRC message reception unit 21 and a measurement report transmission unit 22.

When the mobile station UE is in an RRC_Connected state, the RRC message reception unit 21 is configured to receive the RRC message such as the "RRCReconfiguration" message from the radio base station eNB.

For example, the RRC message reception unit 21 is configured to acquire the measurement-report target CC having a measurement result that should be reported at the same time when the "MeasReport" is transmitted, and the maximum number of cells, on the measurement-report target CC, having a measurement result that should be reported, from the received "RRCReconfiguration" message, in addition to "MeasConfig".

The measurement report transmission unit 22 is configured to transmit a "MeasReport" message including a measurement result "MeasResults" in a cell of which the number is equal to or less than the maximum number acquired by the RRC message reception unit 21, for each measurement-report target CC acquired by the RRC message reception unit 21.

Hereinafter, with reference to FIG. 4 through FIG. 8, a handover process in the mobile communication system according to the first embodiment of the present invention will be described.

As shown in FIG. 4, when the mobile station UE performs a CA communication with a radio base station #A, the radio base station #A transmits an "RRCReconfiguration" message including "MeasConfig" to the mobile station UE in step S1001.

Furthermore, the "MeasConfig" includes "ReportConfigEUTRA". The "ReportConfigEUTRA" is a kind of "ReportConfig", and is "ReportConfig" dedicated for "MeasObject" of E-UTRA (an LTE scheme). FIG. 5 shows an example of a format of the "ReportConfigEUTRA".

For example, as shown in FIG. 5, the radio base station #A (the RRC message transmission unit 11) is configured to notify a list of the measurement-report target CC having a measurement result that should be reported at the same time when "MeasReport" is transmitted, by "measObjectIdList-r10" in an information element "reportOnOtherCCr10" in the "ReportConfigEUTRA".

Designating the measurement-report target CC is beneficial to suppress the size of the "MeasReport". For example, since propagation loss is approximately the same in a plurality of CCs on the same band, when cells of a plurality of CCs are overlaid, the measurement results thereof are approximately the same. Consequently, it is not necessary to report the measurement results of all CCs, and when only a measurement result of a particular CC is obtained, it is possible for the radio base station eNB to estimate the rest.

Furthermore, as shown in FIG. 5, the radio base station #A (the RRC message transmission unit 11) is configured to notify the maximum number (report best N cell per CC) of cells, on the measurement-report target CC, having a measurement result that should be reported by "maxReportCellsPerCC-r10" in the information element "reportOnOtherCC-r10" in the "ReportConfigEUTRA".

In step S1002, the mobile station UE transmits an "RRCReconfigurationComplete" message to the radio base station eNB#A.

In step S1003, the mobile station UE transmits "MeasReport" to the radio base station eNB#A, wherein the "MeasReport" includes measurement results "MeasResults" of cells on a measurement-report target CC designated by the "ReportConfigEUTRA", the number of which is equal to or less than the maximum number "N" designated by the "ReportConfigEUTRA".

Furthermore, trigger of the "MeasReport" follows a condition of "Event A3" and the like designated by "ReportConfig". Furthermore, as in the conventional art, that is, as in an LTE Release-8 scheme, the "MeasReport" includes a measurement result of a cell in which the condition is satisfied and a measurement result of a current serving cell (Pcell during a CA communication), on "MeasObject" to which the "ReportConfig" has been linked by "MeasId".

FIG. 6 shows an example of a format of the "MeasResults".

For example, the mobile station UE (the measurement report transmission unit 22) is configured to transmit "MeasReport", which includes a measurement result "MeasResults (Best N cell information per CC)" of the maximum number "N" of cells having a good radio quality, for each measurement-report target CC.

That is, in a conventional "MeasReport", only measurement results of a cell, in which a condition to trigger the "MeasReport" is satisfied and a current serving cell, are reported. However, in the present invention, a measurement result of cell on another CC is also obtained.

Furthermore, when only the measurement result of a cell of which the number is smaller than the "N" is obtained for each measurement-report target CC, the mobile station UE may transmit "MeasReport" which includes a measurement result "MeasResults (Best N cell information per CC)" of the cell of which the number is smaller than the "N".

Furthermore, when a measurement result is old for a predetermined time or more, the mobile station UE may determine that the measurement result is not kept. The predetermined time may be designated from the radio base station eNB or may be designated in each CC.

Furthermore, the mobile station UE may include only the measurement result of a cell having the optimal quality on each CC and a cell having a quality within a predetermined quality difference from the above cell. In this case, the number of cells including the measurement results may be smaller than the "N". Furthermore, the predetermined quality difference may be designated from the radio base station eNB or may be designated in each CC.

Furthermore, the mobile station UE may include only the measurement result of a particular cell on each CC. Also in this case, the number of cells including the measurement result may be smaller than the "N". Furthermore, the particular cell may be designated from the radio base station eNB or may be designated in each CC.

In step S1004, the radio base station eNB#A determines "Best N cell information per CC" to be set in "HandoverPreparationInformation".

Furthermore, the radio base station eNB#A (the handover control unit 12) may determine the "Best N cell information per CC" on the basis of the "MeasResults (Best N cell information per CC)" in the "MeasReport" received from the mobile station UE, or may determine the "Best N cell information per CC" on the basis of other references.

For example, the radio base station eNB#A may determine the "Best N cell information per CC" by combining multiple "MeasReport" received from the mobile station UE in the near past.

In step S1005, the radio base station eNB#A transmits the "HandoverPreparationInformation", which includes the "Best N cell information per CC" determined in step S1004 and multiple "KeNB*", to a radio base station eNB#B.

The "KeNB*" is a key serving as a base required for creating a security key to be applied to communication with the mobile station UE in cells subordinate to the radio base station #B.

The "KeNB*" is different in the cells subordinate to the radio base station #B, and thus it is necessary for the radio base station eNB#A to create the "KeNB*" for all cells subordinate to the radio base station #B, which are likely to be Pcell, and transfer the "KeNB*" to the radio base station #B.

Figures 8, 9:
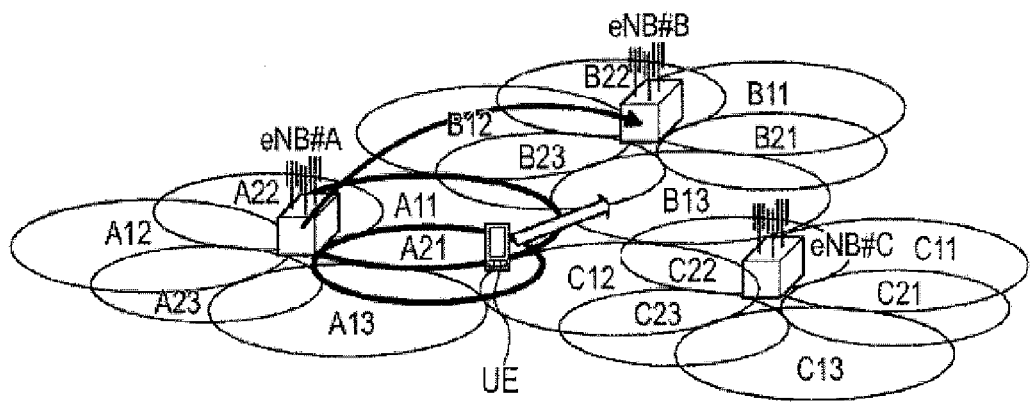
FIG. 8 is a diagram showing an example of a format of an information element "Meas-Context" in the "HandoverPreparationInformation" message used in the mobile communication system according to the first embodiment of the present invention.
FIG. 9 is a diagram for explaining a conventional mobile communication system.

FIG. 7 shows an example of a format of the "HandoverPreparationInformation", and FIG. 8 shows an example of a parameter set in "meas-Context-r10" in an information element "HandoverPreparationInformation-v10x0-IEs" in the "HandoverPreparationInformation".

For example, the radio base station eNB#A is configured to transmit a measurement result of a predetermined number of cells, for each measurement-report target CC, to the radio base station eNB#B by the "meas-Context-r10" in the information element "HandoverPreparationInformation-v10x0-IEs" in the "HandoverPreparationInformation".

In step S1006, the radio base station eNB#B determines Pcell and Scell of the mobile station UE on the basis of the measurement results and the like notified by the "HandoverPreparationInformation".

In step S1007, the radio base station eNB#B transmits an "HO Preparation Ack" message to the radio base station eNB#A, wherein the "HO Preparation Ack" message includes an "HO Command" message including information on the Pcell and Scell of the mobile station UE.

In step S1008, the radio base station eNB#A transmits the "HO Command" message to the mobile station UE, wherein the "HO Command" message includes the information on the Pcell and Scell of the mobile station UE.

The mobile station UE transmits "HO Complete" to the radio base station eNB#B in step S1009, the radio base station eNB#B transmits "Path Switch" to a mobile management node MME in step S1010, and the mobile management node MME transmits "Path Switch Ack" to the radio base station eNB#B in step S1011.

Then, in step S1012, context information on the mobile station UE managed in the radio base station eNB#A is released.

In accordance with the mobile communication system according to the present embodiment, the mobile station UE is configured to notify the radio base station eNB#A of measurement results "MeasResults" of "N" cells, for each measurement-report target CC designated by "ReportConfigEUTRA", the "N" being a number designated by the "ReportConfigEUTRA", and the radio base station eNB#A is configured to transmit the measurement results of the "N" cells to the radio base station eNB#B, and thus it is highly probable that the radio base station eNB#B can select a cell with a good radio quality as Scell, and it is possible to avoid an increase in interference.

In addition, in the mobile communication system according to the present embodiment, the measurement-report target CC or the "N" is designated by "ReportConfigEUTRA". However, this may be designated to the mobile station UE from the radio base station by other methods.

For example, as an information element immediately below the "MeasConfig", the measurement-report target CC or the "N" may be set, and "necessity or non-necessity" of report of measurement results of a cell on the measurement-report target CC may be set in each "ReportConfig".

Only when performing measurement report corresponding to "MeasId" linked to the "ReportConfig" in which the "necessity" of the report has been set, the mobile station UE transmits "MeasReport" including the measurement results of the cell on the measurement-report target CC.

Alternatively, only when the "necessity or non-necessity" of the report is set as a part of setting in the "MeasConfig", the "necessity or non-necessity" of the report is set as a part of setting in the "ReportConfig", and the measurement report corresponding to the "MeasId" linked to the "ReportConfig", in which the "necessity" of the report has been set, is performed, the mobile station UE transmits "MeasReport" including measurement results of a cell on CC corresponding to "MeasObject" in which the "necessity" of the report has been set.

Furthermore, in the aforementioned example, a condition to trigger the "MeasReport" has been originally satisfied, and thus a cell including the measurement results may not be included in cells of CC having the measurement result that should be additionally reported.

The characteristics of the present embodiment as described above may be expressed as follows.

A first characteristic of the present embodiment is summarized in that a mobile communication method, in which a mobile station UE performs a CA communication with a radio base station eNB#A by using a plurality of CCs (carriers) having different carrier frequencies, includes: a step of notifying, by a radio base station eNB, the mobile station UE of "MeasConfig (a condition under which a measurement report is triggered)", measurement-report target CC having a measurement result that should be reported at the same time when "MeasReport (measurement report)" is performed, and the maximum number "N" of cells, on the measurement-report target CC, having a measurement result that should be reported; and a step of transmitting, by the mobile station UE, a measurement result in a cell of which the number is equal to or less than the notified maximum number "N", for each notified measurement-report target CC.

In the first characteristic of the present embodiment, the mobile communication method may include a step of transmitting, by the radio base station eNB#A, a measurement result of a predetermined number of cells, for each measurement-report target CC, to another radio base station eNB#B in a handover process of the mobile station UE from a cell subordinate to the radio base station eNB#A to a cell subordinate to the radio base station eNB#B.

A second characteristic of the present embodiment is summarized in that a radio base station eNB#A, which is used in a mobile communication system in which a mobile station UE is configured to be capable of performing a CA communication with the radio base station eNB#A by using a plurality of CCs having different carrier frequencies, includes: an RRC message transmission unit 11 (a notification unit) configured to notify the mobile station UE of "MeasConfig", measurement-report target CC having a measurement result that should be reported at the same time when "MeasReport" is performed, and the maximum number "N" of cells, on the measurement-report target CC, having a measurement result that should be reported.

In the second characteristic of the present embodiment, the radio base station eNB#A may include a handover control unit 12 (a transmission unit) configured to transmit a measurement result of a predetermined number of cells, for each measurement-report target CC, to another radio base station eNB#B in a handover process of the mobile station UE from a cell subordinate to the radio base station eNB#A to a cell subordinate to the radio base station eNB#B.

A third characteristic of the present embodiment is summarized in that a mobile station UE, which is configured to be capable of performing a CA communication with a radio base station eNB#A by using a plurality of CCs having different carrier frequencies, includes: an RRC message reception unit 21 configured to receive, from the radio base station eNB#A, an "RRC Reconfiguration" message (a control signal) including "MeasConfig", measurement-report target CC having a measurement result that should be reported at the same time when "MeasReport" is performed, and the maximum number "N" of cells, on the measurement-report target CC, having a measurement result that should be reported; and a measurement report transmission unit 22 configured to transmit a measurement result in a cell of which the number is equal to or less than the maximum number included in the "RRC Reconfiguration" message, for each measurement-report target CC included in the received "RRC Reconfiguration" message.

In addition, the operations of the mobile station UE and the radio base station eNB may be performed by hardware, a software module executed by a processor, or a combination of the both.

The software module may be arranged in a storage medium of an arbitrary format such as a RAM (Random Access Memory), a flash memory, a ROM (Read Only Memory), an EPROM (Erasable Programmable ROM), an EEPROM (Electronically Erasable and Programmable ROM), a register, a hard disk, a removable disk, or a CD-ROM.

The storage medium is connected to the processor so that the processor can write and read information into and from the storage medium. Such a storage medium may also be accumulated in the processor. Such a storage medium and processor may be arranged in an ASIC. The ASIC may be arranged in the mobile station UE and the radio base station eNB. Furthermore, the storage medium and the processor may be arranged in the mobile station UE and the radio base station eNB as a discrete component.

Thus, the present invention has been explained in detail by using the above-described embodiments; however, it is obvious that for persons skilled in the art, the present invention is not limited to the embodiments explained herein. The present invention can be implemented as a corrected and modified mode without departing the gist and the scope of the present invention defined by the claims. Therefore, the description of the specification is intended for explaining the example only and does not impose any limited meaning to the present invention.

INDUSTRIAL APPLICABILITY

As described above, according to the present invention, it is possible to provide a mobile communication method, a radio base station, and a mobile station, with which it is possible to select Scell of a mobile station UE without an increase in interference in a handover of the mobile station during a CA communication.

REFERENCE SIGNS LIST eNB . . . Radio base station
11 . . . RRC message transmission unit
12 . . . Handover control unit
UE . . . Mobile station
21 . . . RRC message reception unit
22 . . . Measurement report transmission unit

The invention claimed is:

1. A mobile communication method, in which a mobile station communicates with a radio base station by using a plurality of carriers having different carrier frequencies, comprising:

a step A of notifying, by the radio base station, the mobile station of a condition under which a measurement report is triggered, a measurement report target carrier having a measurement result that should be reported at the same time when the measurement report is performed, and whether to report a measurement result in a cell on the measurement-report target carrier; and a step B of transmitting, by the mobile station, a measurement result in a cell in which the condition is satisfied, and a measurement result of a current serving cell, to the radio base station, a step C of transmitting, by the radio base station, the measurement result to another radio base station, in a handover process of the mobile station, from a cell subordinate to the radio base station to a cell subordinate to the other radio base station, wherein in the step B, when reporting the measurement result of the cell on the measurement report target carrier, the mobile station transmits also a measurement result in a cell, which is excluded from the cell where the condition is satisfied, and the current serving cell, and which has an optimal quality on the measurement report target carrier.

2. A radio base station, which is used in a mobile communication system in which a mobile station is configured to be capable of communicating with a radio base station by using a plurality of carriers having different carrier frequencies, comprising:

a notifying processor configured to notify the mobile station of a condition under which a measurement report is triggered, a measurement-report target carrier having a measurement result that should be reported at the same time when the measurement report is performed, and whether to report a measurement result in a cell on the measurement report target carrier, and a transmitter configured to transmit the measurement result to another radio base station, in a handover process of the mobile station, from a cell subordinate to the radio base station to a cell subordinate to the other radio base station.

* * * * *